Jan. 23, 1968  A. C. SANFORD  3,364,805
CONNECTOR PLATE

Filed April 2, 1965  4 Sheets-Sheet 1

INVENTOR.
ARTHUR CAROL SANFORD
BY Hamilton & Cook

ATTORNEYS

INVENTOR.
ARTHUR CAROL SANFORD
BY Hamilton & Cook

ATTORNEYS

Jan. 23, 1968     A. C. SANFORD     3,364,805
CONNECTOR PLATE

Filed April 2, 1965     4 Sheets-Sheet 4

INVENTOR.
ARTHUR CAROL SANFORD
BY Hamilton & Cook
ATTORNEYS

United States Patent Office 3,364,805
Patented Jan. 23, 1968

3,364,805
CONNECTOR PLATE
Arthur Carol Sanford, Palm Beach, Fla., assignor to Sanford Industries, Inc., Pompano Beach, Fla., a corporation of Florida
Filed Apr. 2, 1965, Ser. No. 444,991
3 Claims. (Cl. 85—13)

ABSTRACT OF THE DISCLOSURE

A connector plate for joining wooden members, the plate having a plurality of openings aligned end to end with teeth extending divergently outwardly from the bridge separating adjacent ends of successive, aligned openings in staple-like pairs. The teeth, and preferably the bridge also, are crimped with a continuous ridge extending from the tip to the root of each tooth and across the bridge between each pair of teeth so as to extend outwardly of the plate in the same direction as the teeth extend. Further details of the plate can be appreciated from an understanding of a preferred method by which they are formed. A metallic blank is coined at selected locations to define at least primary indentations. The blank is then crimped through the primary indentations to define a depression on the same side of the blank as the coined indentations to define a ridge on the opposite side. The teeth are then struck, two from each opening, so that they extend outwardly of the plate on the same side as the ridge and so that the tips of the teeth are stretched to a chisel-like bevel from the coined indentations.

---

The present invention relates generally to connector plates for connecting wooden members together at a joint, and more particularly to connector plates having a plurality of teeth struck therefrom which may be embedded into the wood of the members to be connected thereby. Specifically, the present invention relates both to a unique method for manufacturing a toothed connector plate and the plate formed thereby.

Toothed connector plates are particularly adapted for connecting wooden structural members. The strength of the joint connected by a connector plate is the result of several factors, including the strength of the plate itself and the strength of the engagement between the teeth and the wooden members into which they are embedded.

The strength of the plate itself includes both the tensile and shear strength of the plate. The tensile strength is the measure of the ability of the effective cross section of that portion of the plate parallel to the wooden members to resist tensile forces. The shear strength is generally measured by the aggregate shear strength of the teeth parallel to the plate at their roots.

The strength of the engagement between the teeth and the wooden member is often termed the holding power of the teeth—i.e., the resistance offered by the teeth against extraction from the wooden structural members into which they are embedded. One measure of tooth holding power is the relation of the lineal penetration of the teeth into the wood per unit of area of the plate.

When one considers that connector plates are generally applied to both sides of a joint it is appreciated that the length of the teeth cannot be excessive, particularly when joining two-inch dimensional lumber. Moreover, because it has been found that plates are more economically secured by roller presses as compared to punch presses, the length of the teeth should be kept minimal.

This suggests the necessity for increasing the number of teeth per unit area of the plate in order to supply the desired penetration. However, the greater the number of teeth, the more danger there is in splitting the wooden members, or at least severing sufficient of the wood fibers so that the effective strength of the structural members themselves fall below the effective strength of the connector plates used to join them.

Damage to the wooden members can, of course, be partially alleviated by reducing the size of the teeth and sharpening them. However, the reduction in the size of the tooth reduces its bending strength, tending to permit it to bend, or collapse, when subjected to embedment pressures, and, while the sharpening of the teeth does facilitate entry thereof into the wood, sharpening the teeth has heretofore been found to be quite difficult, time consuming and costly.

It is therefore an object of the present invention to provide a connector plate in which the teeth are capable of providing a satisfactory lineal penetration for unit area of the plate without splitting the wood or unnecessarily cutting the wood fibers and thereby adversely affecting the effective strength of the structural member into which they are embedded.

It is another object of the present invention to provide a connector plate, as above, in which the teeth are especially effective against undesirable bending upon embedment.

It is still another object to provide a connector plate as above, in which the teeth act in pairs, staple-like, so as to splay outwardly away from each other with ease upon penetration but which resist splaying inwardly toward each other and thus resist withdrawal of the teeth from the wooden members by this clinching action.

These and other objects which will become apparent from the following specification are accomplished by means hereinafter described and claimed.

One preferred embodiment of the plate is shown by way of example in the accompanying drawings and hereinafter described in detail without attempting to show all of the various forms and modifications in which the invention might be embodied; the invention being measured by the appended claims and not by the details of the specification.

In general terms the method of manufacturing connector plates according to the present invention comprises three steps unique to this art. The metal stock, or blank, is first coined to provide at least primary indentations at selected locations along a parallel grid pattern and is then crimped to form a series of parallel ridges on one side of the plate and corresponding depressions on the other. With the blank thus prepared the teeth are struck therefrom in staple-like pairs with the crimp extending from the tip to the root of each tooth and across the bridge portion of the plate which extends between the roots of the staple-like paired teeth. The teeth are struck so that two will be formed from each opening and so that the teeth separate at the primary indentations.

Referring more particularly to the drawings, a connector plate manufactured according to the concept of the present invention, and designated generally by the numeral 10, is depicted connecting the lower chord member 11 to the kingpost 12 of a wooden truss. Generally, a plate 10 is applied to each side of such joints.

Figure 3:
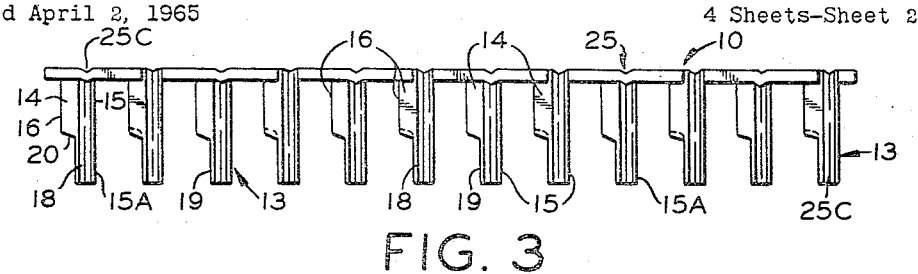
FIG. 3 is an enlarged end elevation taken substantially on line 3—3 of FIG. 2.
Figure 4:
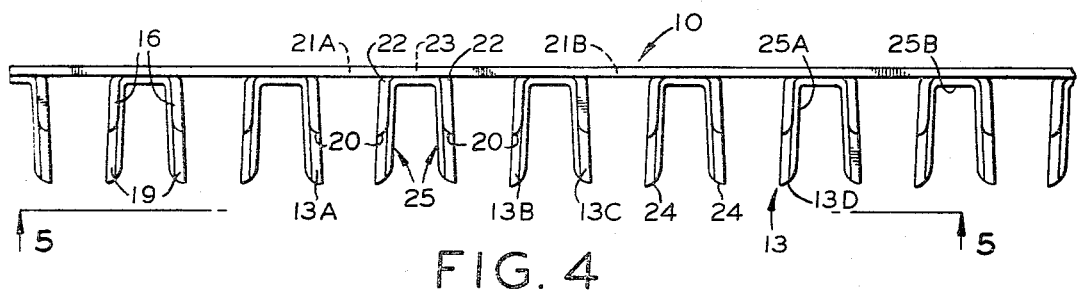
FIG. 4 is an enlarged side elevation taken substantially on line 4—4 of FIG. 2.
Figure 5:
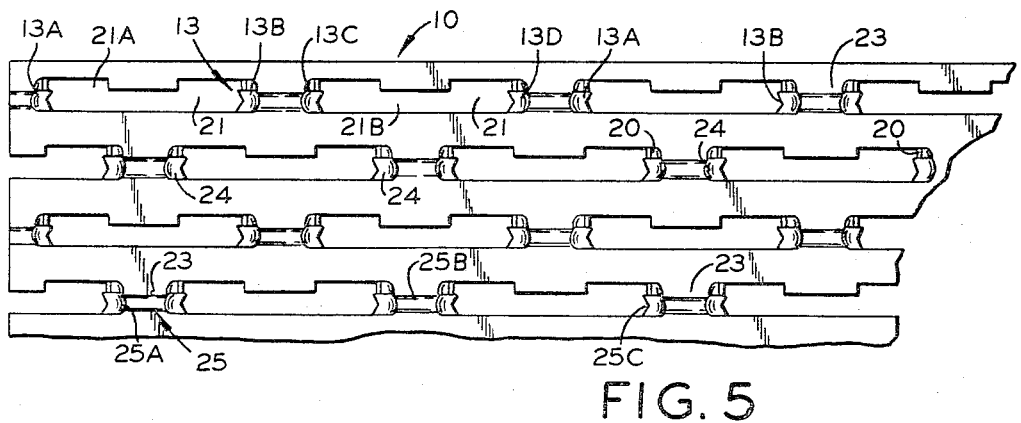
FIG. 5 is a partial bottom plan view taken substantially on line 5—5 of FIG. 4.
Figure 7:
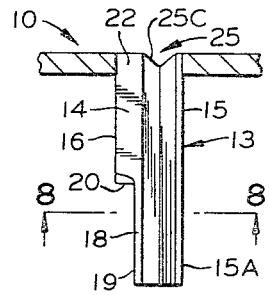
FIG. 7 is an enlarged sectional taken substantially on line 7—7 of FIG. 2 showing one tooth in elevation.
Figure 8:
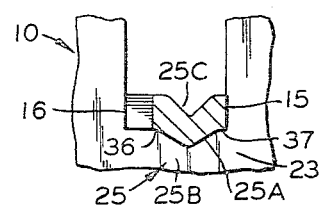
FIG. 8 is a cross section taken substantially on line 8—8 of FIG. 7.

The teeth, indicated generally by the numeral 13 and best seen in FIGS. 3, 7 and 8, are embedded into the wooden members 11 and 12. The teeth are struck, or punched, from the plate to extend outwardly thereof in staple-like pairs, as is best shown in FIG. 4 and as will be more fully hereinafter explained.

Each tooth 13 has a thickness generally equal to the thickness of the plate because it was struck therefrom, and each tooth has a base portion 14 the sides 15 and 16 of which are generally parallel and extend substantially outwardly from the plate.

An outer portion 18 having a lesser width than the base portion 14 is formed integrally outwardly thereof with one edge 15A being preferably a continuation of edge 15 of a base portion 14, and a second edge 19 parallel thereto but spaced closer to edge 15A than the corresponding edge 16 of the base portion 14 is spaced to edge 15. Edges 16 and 19 are joined by a shoulder 20 which may either be inclined, or "squared off" as shown.

The preferred proportions of the teeth can best be seen in FIGS. 3 and 7. The width of the base portion 14 is approximately one-third the length of the tooth 13 with the length of the base portion 14 being approximately one-half the length of the tooth, and the width of the outer portion 18 being approximately one-half the width of the base portion 14. Applying these preferred proportions to obtain dimensions for a typical tooth constructed according to the concept of the present invention, a tooth approximately three-eighths of an inch in length would have a base portion one-eighth of an inch in width and approximately three-sixteenths of an inch long with the width of the outer portion 18 being approximately one-sixteenth of an inch.

Figure 1:
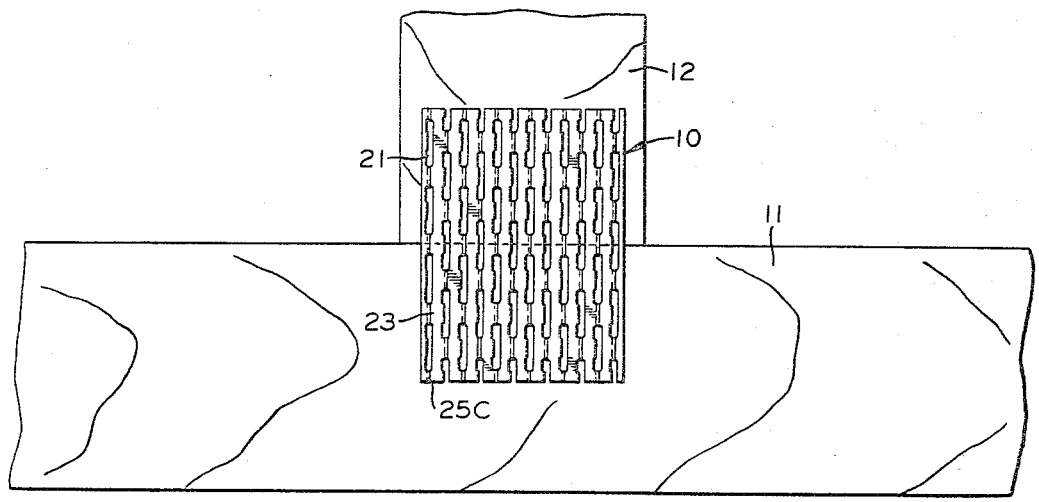
FIG. 1 is an elevation of a typical truss joint showing the connector plate according to the concept of the present invention in top plan.
Figure 2:
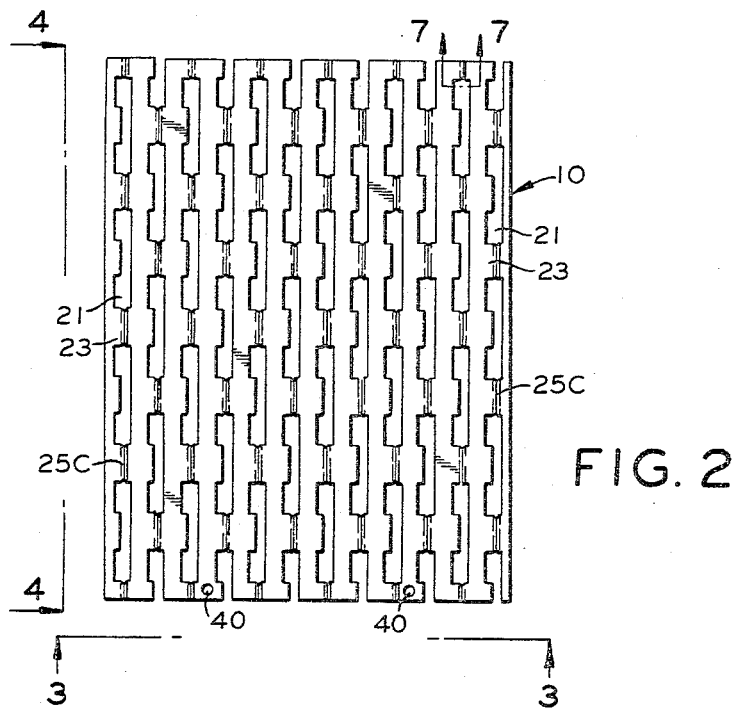
FIG. 2 is an enlarged top plan of the connector plate shown in FIG. 1.

Each tooth 13 extends outwardly from the plate at a slight inclination with respect to a true perpendicular from the plane of the plate. This inclination, in conjunction with the way the teeth are located and sharpened, contributes to the clinching action of the teeth which augments the holding power of the plate. As best seen in FIGS. 2 and 4, facing teeth 13A and 13B are punched from the same opening 21A having a configuration which is the same as the outline of the two teeth struck therefrom. Facing teeth 13C and 13D are similarly struck from opening 21B with the two teeth 13B and 13C from successive openings 21A and 21B forming a spaced apart, staple-like pair of teeth, the roots 22 of which are joined by that portion of the plate which forms a bridge 23.

It can also be observed from FIG. 4 that the tip 24 of the teeth in each pair are chisel-beveled, or sharpened, outwardly and away from the other tooth of the pair. Similarly, too, the shoulder 20 is bevel sharpened. The obvious result of this chisel-like bevel sharpening of the tip 24 and shoulder 20 is that it facilitates entry of the tooth into the wood. That is, the bevel sharpening of the aforementioned edges allows the embedment of the teeth to be accomplished with the minimum tearing and crushing of the wood fibers. This has been found not only to lower the required embedment pressure but also to reduce the tendency of the wood to split or be otherwise damaged.

Figure 6:
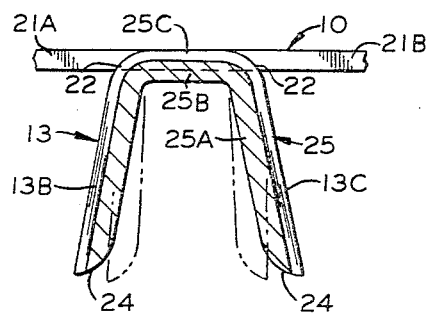
FIG. 6 is a further enlarged view of an area of FIG. 4 showing the pre-entry position of the teeth in phantom and the embedded position in solid line.

The shape of the teeth disclosed also contribute to this improved entry, or embedment. The lesser width of the outer portion 18 results in easier entry of the tooth into the wood by dividing the resistance offered by the wood against entry of the teeth over two layers of the wood fibers. The entry of the tooth can thus be considered as a two-stage operation which has been found to require a lesser total force to accomplish embedment without adversely affecting the holding power of the teeth. Equally important, however, the particular beveling of the tip 24 and shoulder 20, together with the corresponding outward divergence of the paired teeth 13B and 13C causes them to splay away from each other as they are driven into the wood, as shown in FIG. 6 wherein the phantom representation of the teeth depicts their pre-entry position and the full line representation depicts their embedded position.

As will be further observed from a study of FIGS. 3, 4, 7 and 8, a crimp 25 extends from the tip 24 to the root 22 of each tooth. This crimp forms a ridge 25A extending outwardly from that side of each tooth facing toward that tooth with which it is paired. More specifically, the ridge 25A on tooth 13C extends outwardly therefrom in a direction toward its paired tooth 13B. It will be further observed that the crimp 25 along the paired teeth join each other across the bridge 23 in a ridge 25B which extends outwardly from the plate in the same direction in which the teeth extend. A depression 25C, generally corresponding to the ridge 25A, is formed on the opposite side of the teeth 13 and the bridge 23 by the crimp 25.

This crimp 25 performs multiple duties. That portion which lies along the extent of the tooth increases the columnar strength of the tooth so that it resists the bending stresses imparted thereto during the application of the embedment pressure. Further, the continuity of the ridge 25A as it extends from each tooth, around the root thereof and across the bridge 23 provides a unity to the teeth so joined which causes them to function cooperatively as a pair—staple-like. This cooperation transforms the mere outward splaying of the teeth engendered by the particular sharpening and orientation into a locking, or clinching, of the teeth beneath undamaged fibers. More specifically, the particular disposition of the ridge 25C readily permits the teeth to splay outwardly away from each other as they enter the wood, but prevents them from reversely splaying inwardly toward each other when withdrawal forces are applied.

It should therefore be apparent that a connector plate embodying the above concept provides teeth which provide easy entry without unnecessarily damaging the wood fibers and which, upon embedment, clinchingly lock into the wood to provide high withdrawal resistance.

The preferred method for making such a plate employs the following steps. The metal stock, or blank, which may be in the desired final shape, in sheets or in rolls, and of the desired thickness is first coined.

Figure 9:
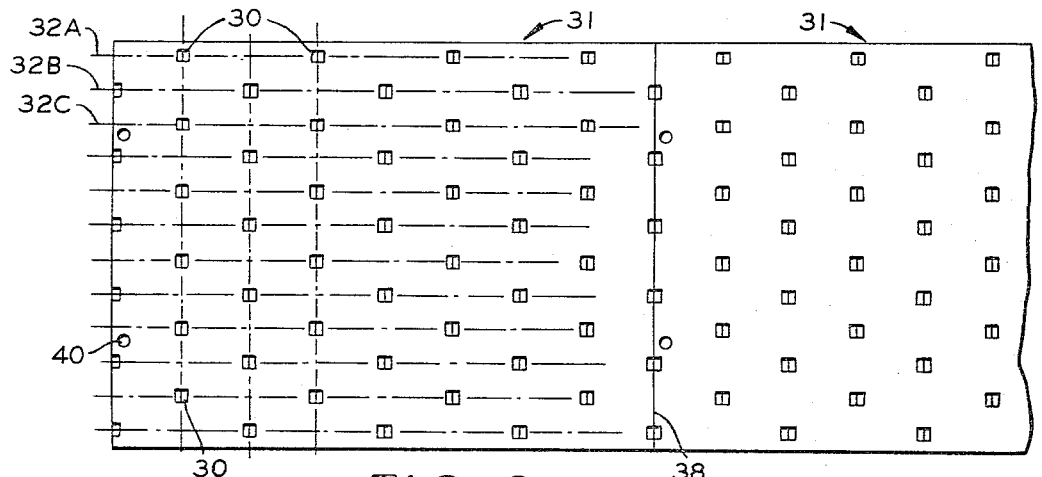
FIG. 9 is a plan view of a blank from which a connector plate according to the present invention is fabricated depicting the coined primary indentations at selected locations along a grid system.

As shown in FIG. 9, a plurality of primary indentations 30 are coined into one side of the blank 31 at selected locations along a parallel grid system. The parallel grids 32A, 32B, etc. of this referential grid system are spaced apart the distance desired for lateral spacing of the teeth, and the primary indentations 30 are located with respect to the desired longitudinal orientation of the teeth. The disposition of the indentations shown in FIG. 9 will result in a staggering of the teeth between adjacent rows.

Figure 10:
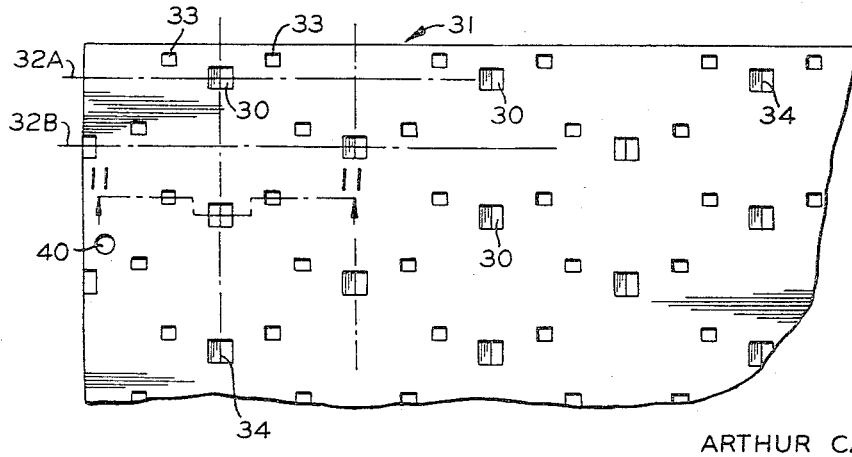
FIG. 10 is an enlarged partial area of FIG. 9 showing, in addition to the primary indentations, the coined secondary indentations.

At the same time a series of secondary indentations 33 (FIG. 10) may also be coined into the same side of the blank 31 laterally of the grids and at spaced intervals longitudinally of the primary indentations 30. The primary indentations 30 will contribute to the formation of the tips 24 of the teeth, and the secondary indentations 33 will contribute to the formation of the shoulders 20, as will be hereinafter more fully explained.

To impart a more complete understanding, let it be assumed that the connector plates are to be fabricated from 20 gauge steel which, based upon a desirable unit weight, would measure approximately 0.038 of an inch in thickness. For such a thickness a desirable depth of the coining has been found to be 0.030 inch.

Figure 11:
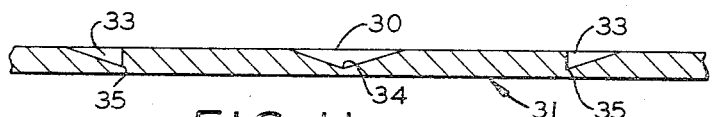
FIG. 11 is a further enlarged cross section taken substantially on line 11—11 of FIG. 10.

As shown in FIG. 11, the primary indentations 30 preferably have a cross section in the shape of an isosceles prism with the vertex 34 oriented transversely to grids 32. The secondary indentations 33 preferably also have a prismatic cross section which may conveniently be right angled rather than isosceles. The vertex 35 of the secondary indentations 33 may also be oriented transversely the direction of the grid system if the shoulder 20 is to be "squared off," but may as well be angled with respect to the grid system if the shoulder 20 is to be inclined.

It is also desirable to form pilot holes 40 in the blank 31 during the coining process so that the blank may be properly oriented for subsequent steps.

After the blank 31 has been coined it is crimped. That is, a series of parallel crimps 25 which form a ridge 25A on one side of the blank and a series of corresponding depressions 25C on the other side of the blank are impressed onto the blank along the grids 32 so that the depressions 25C will lie on the same side of blank 31 as, and extend through, the primary indentations 30.

Figure 13:
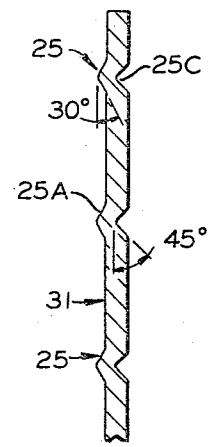
FIG. 13 is an enlarged cross section taken substantially on line 13—13 of FIG. 12.

Continuing the example of the plate and tooth size herein used to explain the subject concept, FIG. 13 depicts a desirable cross section for the crimp 25. The lateral span of the depression 25C would be 0.050 inch and the lateral span of the ridge 25A would be 0.060 inch with the inclination of the sides of the depression being 45° and the inclination of the sides of the ridges being 30°, both with respect to the plane of the blank 31.

It should be apparent that while the coining and crimping operations are most conveniently performed in the named succession, the order may be reversed without serious disadvantage and in some circumstances the coining may be accomplished during the crimping operation.

Following the coining and crimping operations, the teeth are struck from the blank. The pilot holes 40 formed during the initial step in the fabrication of the connector plates and used to align the blank for the second step are also used to align the blank properly with the dies by which the teeth are struck. More particularly, the dies are oriented so that as they strike the teeth, two (13A and 13B) will emerge from the same opening 21 with the ridge 25A extending from the tip 24 to the root 22 of each tooth.

Figure 15:
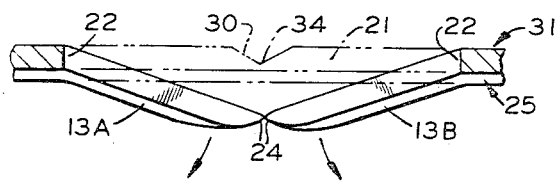
FIG. 15 is an enlarged cross section taken substantially on line 15—15 of FIG. 12 showing the bevel sharpening of the tips.
Figure 14:
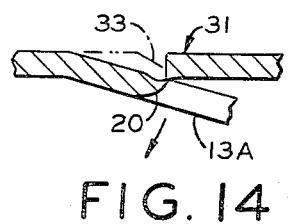
FIG. 14 is an enlarged cross section taken substantially on line 14—14 of FIG. 12 showing the bevel sharpening of the shoulder formed during the striking operation.

As shown most clearly in FIGS. 14 and 15, the teeth are bevel-sharpened in the proper direction as a result of both the coining and striking steps. Because of the coining and the direction in which the teeth are struck, as the tooth is punched from the blank the necking, or stretching, of the metal at the location of the indentations during the application of the yield strength load by the dies sharpens the shoulder 20 (FIG. 14) and tip 24 (FIG. 15) and bevels them chisel-like divergently outwardly with respect to the paired teeth, e.g., 13B and 13C (FIG. 4). Tests have shown that in striking teeth of the size described from 20 gauge blanks the necking stretches the length of a ⅜″ tooth approximately 0.06 inch. Further, the striking operation controls the desired divergency of the teeth comprising the pairs, also best seen in FIG. 4.

To facilitate the striking operation a flat shearing edge is preferred. Accordingly, as best seen from the cross section of the tooth depicted in FIG. 8, the ridge is embraced on each side by flat portions 36 and 37—in the exemplary tooth discussed at least 0.015 of an inch on each side.

Figure 12:
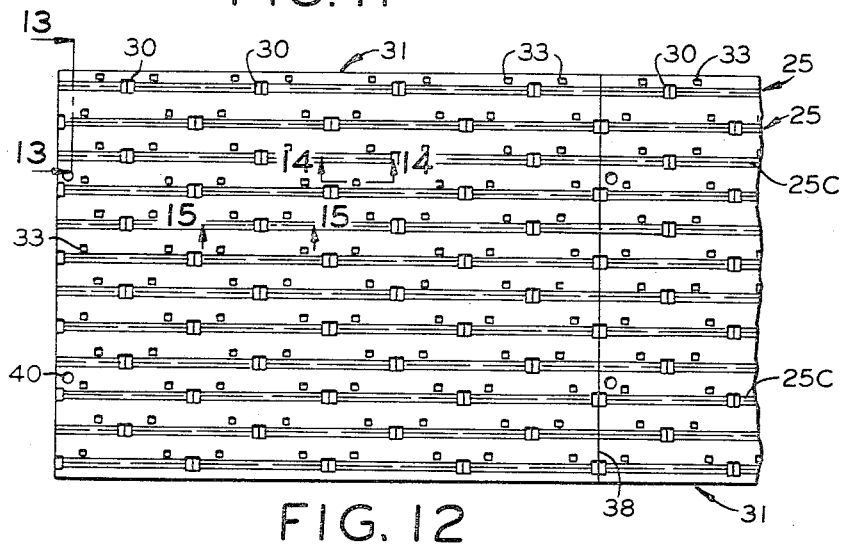
FIG. 12 is a plan view similar to FIG. 9 showing the crimping of the coined blank.

After the blank 31 has been thus coined, crimped and struck, connector plates can be cut to the desired length, as along line 38 in FIGS. 9 and 12.

Figure 16:
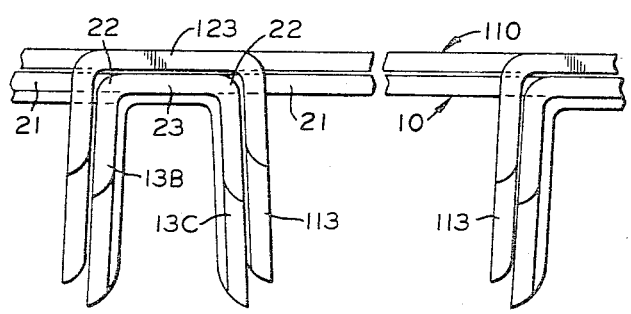
FIG. 16 is a sectional view of a joint employing a master connector plate with a lag plate superimposed thereon, both said plates constructed according to the present invention.

To join some wooden members, as for example a high stress tensile joint wherein the exposed surfaces are of limited extent, it may be desirable to use two connector plates on one surface. Such a situation is depicted in FIG. 16, wherein a master plate 10 is applied contiguous to the wooden structural members and a lag plate 110 is applied thereover. To do this, of course, the lag plate 110 needs only differ from the master plate 10 in that the bridge 123 is of a dimension sufficient to span the bridge 23 and the roots 22 of the paired teeth 13B and 13C on the master plate 10. With only this minor difference the teeth 113 on lag plate 110 will extend through opening 21 in plate 10 and also embed themselves into the wooden structural members.

It should thus be apparent that the disclosed method is capable of fabricating plates which embody all the advantages described herein and otherwise accomplishes the objects of the invention.

What is claimed is:

1. A connector plate for joining wooden members, said plate having a plurality of integral teeth substantially the same thickness as the plate said teeth extending substantially perpendicularly to said plate from one side thereof, each of said teeth having a sharpened penetrating tip and a root and the majority thereof being oriented in spaced apart, staple-like pairs with the plate forming a bridge between the roots of the paired teeth, a crimp extending from the tip to the root of each tooth, said crimp forming a ridge in each tooth which extends outwardly from the side of the tooth facing toward the tooth with which it is paired, said crimps joining across said bridge in a ridge extending outwardly of the plate in the same direction as the teeth extend.

2. A connector plate for joining wooden members, said plate having a plurality of teeth substantially the same thickness as the plate, said teeth extending outwardly from said plate, said teeth having a base portion with a root and an outer portion with a tip, said base portion being joined to the outer portion by a shoulder facing in the same direction as the tip on said outer portion, the majority of said teeth being oriented in spaced apart, staple-like pairs with the plate forming a bridge between the roots of paired teeth, a crimp extending from the tip to the root of each tooth, said crimp forming a ridge in each tooth which extends outwardly from the side of the tooth facing toward the tooth with which it is paired, said crimps joining across said bridge in a ridge extending outwardly of the plate in the same direction as the teeth extend, the shoulder and tip of each tooth being beveled divergently outwardly with respect to the paired teeth.

3. A connector plate, as set forth in claim 2, in which the teeth in each pair extend outwardly and divergently from the bridge joining their roots, a pair of such teeth extending outwardly from the bridge separating adjacent ends of successive openings.

References Cited

UNITED STATES PATENTS

| | | | |
|---|---|---|---|
| 386,742 | 7/1888 | Grellner | 85—13 |
| 483,040 | 9/1892 | Binet | 85—13 |
| 1,921,194 | 8/1933 | Kelly | 85—30 |
| 3,104,429 | 9/1963 | Sanford | 85—13 |

FOREIGN PATENTS 63,966    8/1949    Netherlands.

CARL W. TOMLIN, *Primary Examiner.*

R. S. BRITTS, *Assistant Examiner.*